(12) United States Patent
Furukawa

(10) Patent No.: US 6,828,757 B2
(45) Date of Patent: Dec. 7, 2004

(54) CIRCUIT FOR ADJUSTING CHARGING RATE OF CELLS IN COMBINATION

(75) Inventor: Kimihiko Furukawa, Hirakata (JP)

(73) Assignee: Sanyo Electric Co., Ltd., Moriguchi (JP)

(*) Notice: Subject to any disclaimer, the term of this patent is extended or adjusted under 35 U.S.C. 154(b) by 0 days.

(21) Appl. No.: 10/254,539

(22) Filed: Sep. 26, 2002

(65) Prior Publication Data
US 2003/0062874 A1 Apr. 3, 2003

(30) Foreign Application Priority Data
Sep. 28, 2001 (JP) ........................................ 2001-298964

(51) Int. Cl.[7] .................................................. H02J 7/00
(52) U.S. Cl. ...................................... 320/116; 320/117
(58) Field of Search ................................ 320/116, 117, 320/118, 121, 124, 126, 127, 130

(56) References Cited

U.S. PATENT DOCUMENTS 5,734,205 A * 3/1998 Okamura et al. ........... 307/110
6,054,840 A * 4/2000 Nakanishi et al. .......... 320/118
6,323,623 B1 * 11/2001 Someya et al. ............. 320/166

FOREIGN PATENT DOCUMENTS

| JP | 2001-128379 | 5/2001 |
|----|-------------|--------|
| JP | 2001-231178 | 8/2001 |
| JP | 2001-298964 | 10/2001 |

* cited by examiner

Primary Examiner—Lawrence Luk
(74) Attorney, Agent, or Firm—Armstrong, Kratz, Quintos, Hanson & Brooks, LLP (57) ABSTRACT

A charging rate adjusting circuit which comprises includes a serial line for connecting a plurality of cell blocks, a switch interposed on the line, a plurality of parallel lines for connecting a plurality of parallel connecting points each corresponding to in the cell blocks, switches each interposed on each of the lines, discharge circuits connected to a opposite electrodes of each of the cell modules, a voltage measuring circuit for detecting voltage across each of the cell modules, and a control circuit. The control circuit, in normal operation, sets on the switch and sets off all the switches, while, in adjustment, the circuit sets off the switch and sets on all the switches, and sets on the discharge operation of the circuit based on a detection result of the circuit.

7 Claims, 8 Drawing Sheets

CIRCUIT FOR ADJUSTING CHARGING RATE OF CELLS IN COMBINATION

BACKGROUND OF THE INVENTION

1. Field of the Invention

The present invention relates to a circuit for adjusting the charging rate of cell modules constituting cells in combination which have a high voltage, for example, for use as a power source for drive motors for electric motor vehicles such as hybrid cars. The term "charging rate" as used herein means the percentage to which the cells in combination are charged relative to the full capacity thereof.

2. Description of the Related Art

Power sources conventionally mounted in electric motor vehicles, such as hybrid cars, for drive motors comprise secondary cells connected in series for use in combination. Because combinations of such cells must produce a high voltage usually of 200 to 300 V, for example, 60 to 80 lithium secondary cells each having an output of about 3.6 V are connected in series, or about 200 NiMH secondary cells each having an output of about 1.2 V are connected in series for use in combination.

It is desired that all the secondary cells in combination be equivalent in charged state. Suppose one secondary cell is 70% in charging rate, and another secondary cell is 50% in charging rate. In this case, the amount of electricity chargeable into these cells in combination is 30% which corresponds to the amount of charge for the cell with the charging rate of 70% when it is to be charged to the full. If the two cells are charged to an amount in excess of 30%, the secondary cell with the charging rate of 70% will be charged more than 100% to become greatly shortened in life. Consequently the combination of cells is also shortened in life.

Variations in the amount of electricity remaining in the secondary cells in combination are dependent on the efficiency (charge-discharge efficiency) of the individual cells. For example, suppose the secondary cells in combination are all 100% in charge efficiency and 99.0 to 99.5% in discharge efficiency. If the cells are charged at 10 Ah, charge of 10 Ah is stored in each cell. When the cells are subsequently discharged at 10 Ah, charge of 10.1 Ah (=10 Ah/0.990) is delivered from the cell with a discharge efficiency of 99.0%, and charge of 10.05 Ah (=10 Ah/0.995) is delivered from the cell with a discharge efficiency of 99.5%. Charge which is 0.05 Ah greater will then remain in the cell with the higher discharge efficiency of 99.5%. Accordingly, the amount of remaining electricity varies from cell to cell as a result of repetition of charge and discharge. Especially in the case of lithium ion secondary cells which are exceedingly high in charge-discharge efficiency, slight variations in charge-discharge efficiency result in a pronounced tendency for the cells to vary in the amount of remaining electricity.

Figure 9:
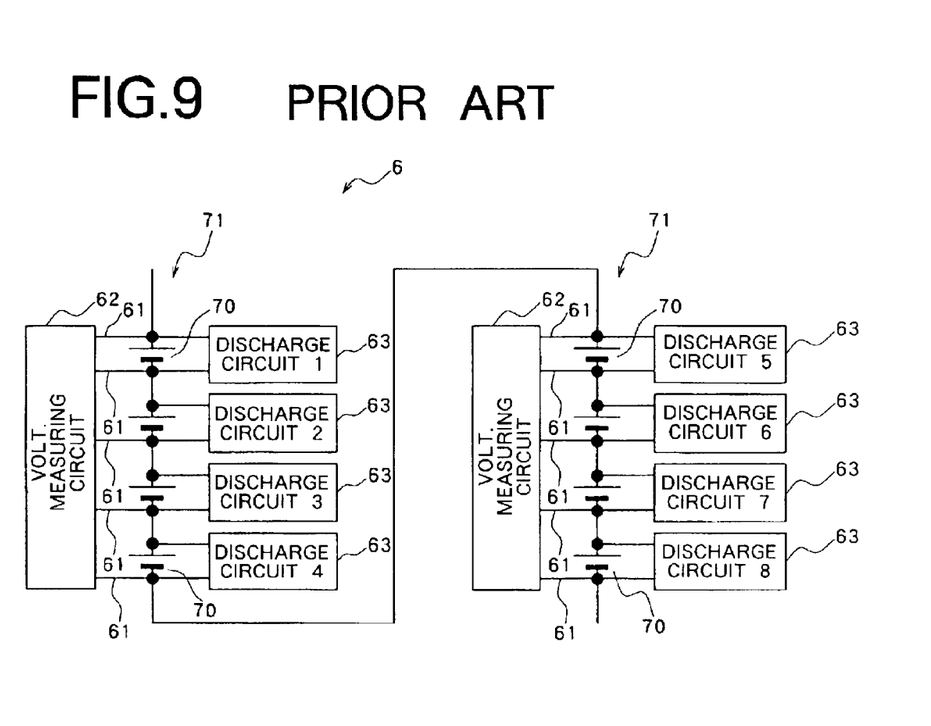
FIG. 9 is a block diagram showing a construction of a conventional charging rate adjusting circuit.

Accordingly, a charging rate adjusting circuit 6 shown in FIG. 9 is used for discharging secondary cells having a greater amount of charge and thereby giving them the same amount of remaining electricity as those of smaller amount of charge. In the case of the circuit, one or a plurality of secondary cells constitute a cell module 70, and four cell modules are connected in series to provide a cell block 71. Two cell blocks 71 are further connected in series to provide cells in combination.

Voltage detecting lines 61 extend from the opposite terminals of each cell block 71 and from the points of connection between two of the cell modules 70 and are connected to a voltage measuring circuit 62. Opposite terminals of each cell module 70 are connected to a discharge circuit 63 which will be described below. The voltage measuring circuits 62, 62 and the discharge circuits 1 to 8 are connected to an unillustrated control circuit. The control circuit controls the discharge operation of the discharge circuits 1 to 8 based on voltage across each cell module 70 measured by the voltage measuring circuits 62, 62.

Figure 10:
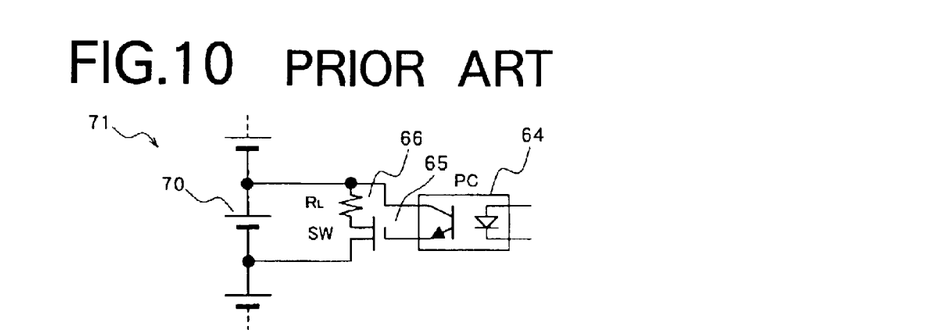
FIG. 10 is a circuit diagram showing a construction of a discharge circuit.

FIG. 10 shows an example of construction of the discharge circuit 63. When a photocoupler 64 is turned on, an on-off switch 65 comprising a MOSFET is closed, causing a current to flow from the cell module 70 to a discharge resistor 66, whereby the charging rate of the cell module 11 can be lowered.

With the charging rate adjusting circuit 6 shown in FIG. 9, the control circuit specifies the cell module(s) 70 of high charging rate based on the voltage measuring result obtained from the voltage measuring circuit 62 62, turning on the photocoupler of the discharge circuit 63 connected to each module 70 of high rate. This reduces the cell module 70 of high rate in charging rate, making all the cell modules equivalent in charging rate.

However, the conventional charging rate adjusting circuit 6 must be provided with a discharge circuit 63 for every cell module 70 constituting the cells in combination, thereby making the circuit large in size, hence the problem of impairing reliability of circuit operation and of a higher cost.

SUMMARY OF THE INVENTION

An object of the present invention is to provide a charging rate adjusting circuit for a cell combination which is adapted to reduce the number of components.

The present invention provides a first charging rate adjusting circuit for a cell combination comprising a plurality of cell blocks each having a plurality of cell modules connected to one another in series, the circuit being adapted to provide one of a uniform charging rate and a uniform voltage to the cell modules. The circuit comprises:

first connecting/disconnecting means for connecting or disconnecting the cell blocks one another in series, second connecting/disconnecting means for connecting or disconnecting one another in parallel the cell modules corresponding to one another in the cell blocks, a plurality of discharge circuits each being connected to opposite electrodes of each of the cell modules constituting at least one cell block and performing discharge operation in response to a discharge command, a voltage detection circuit for detecting voltage across each of the cell modules constituting at least one cell block, and a control circuit for setting the first connecting/disconnecting means into connecting state and setting the second connecting/disconnecting means into disconnecting state in usual operation when the cell combination is operated as a power supply source, while for setting the first connecting/disconnecting means into disconnecting state and setting the second connecting/disconnecting means into connecting state when the charging rate of the cell modules are adjusted, and giving the discharge command to one or a plurality of discharge circuits based on detection result obtained by the voltage detection circuit.

With the first charging rate adjusting circuit of the present invention, in the usual operation, the first connecting/disconnecting means is set into connecting state and the second connecting/disconnecting means is set into disconnecting state. Accordingly, the plurality of cell blocks are connected to one another in series, whereby the overall cell combination is operable as a power supply source.

On the other hand, when the charging rate is adjusted, the first connecting/disconnecting means is set into disconnecting state and the second connecting/disconnecting means is set into connecting state. Accordingly, the plurality of cell modules corresponding to each other in the plurality of cell blocks are interconnected in parallel, and thereby charge moves from a cell module of high charging rate to a cell module of low charging rate. In this way, charge and discharge is conducted between the cell modules, with the result that the plurality of cell modules interconnected in parallel are uniformized in charging rate in the plurality of cell blocks. Variations in charging rate among the cell modules constituting each cell block still remains.

The charging rate of the cell module reflects a voltage value across the cell module with high correlation, and particularly lithium ion secondary cells have this pronounced tendency. Suppose one cell module constituting one cell block has a higher voltage across the module than the other cell modules constituting the one cell block. Then the control circuit will give a discharge command to a discharge circuit which is connected to opposite electrodes of the one cell module, or to opposite electrodes of a cell module connected to the one cell module in parallel.

When the discharge command is input to the discharge circuit to perform the discharge operation, charge moves to the discharge circuit from the one cell module of higher voltage across the module and one or a plurality of cell modules connected to the one cell module in parallel, to discharge these cell modules. As a result, these cell modules are the same as the other cell modules in charging rate. Thus all the cell modules constituting all the cell blocks are made equivalent in charging rate.

When the cell modules of the first charging rate adjusting circuit embodying the invention are adjusted in charging rates, a plurality of cell modules corresponding to each other in a plurality of cell blocks are connected in parallel to discharge these cell modules with one discharge circuit. Accordingly, since the adjusting circuit is provided with the same number of the discharge circuits as that of the cell modules constituting one cell block, the number of the discharge circuits becomes smaller than in the case of the conventional charging rate adjusting circuit which needs to be provided with a discharge circuit for every cell module constituting the cell combination. The discharging rate adjusting circuit of the invention should be provided with the first connecting/disconnecting means and the second connecting/disconnecting means. However, the discharge circuit comprises a number of electronic components, so that the decreased amount of the number of the components due to the reduced number of the discharge circuits is greater than the increased amount of the number of the components due to the provision of the first connecting/disconnecting means and the second connecting/disconnecting means. Consequently, the number of the components of the overall charging rate adjusting circuit becomes smaller than the conventional charging rate adjusting circuit.

Furthermore, with the first discharging rate adjusting circuit of the invention, the plurality of cell modules interconnected in parallel in the plurality of cell blocks can be made uniform in charging rate resulting from charge and discharge between the cell modules, to thereby reduce the variations of the charging rate among all the cell modules constituting the cell combination. The plurality of cell modules constituting each cell block are made uniform in charging rate as a result of the discharge operation of the discharge circuit. Accordingly, the amount of the abandoned energy resulting from the discharge operation of the discharge circuits can be smaller than in the conventional charging rate adjusting circuit wherein all the cell modules constituting the cell combination are uniformized in charging rate only by the discharge operation of the discharge circuit, thereby ensuring effective use of energy.

According to the first construction, the first connecting/disconnecting means comprises one or a plurality of serial lines for interconnecting a plurality of cell blocks in series and a first switch interposed on each serial line. The second connecting/disconnecting means comprises a plurality of parallel connecting points provided on opposite terminals of each of the cell blocks and on points of connection between the plurality of cell modules constituting each cell block, a plurality of parallel lines for interconnecting the parallel connecting points corresponding to each other in the cell blocks, and second switches interposed on each parallel line.

According to the first construction, in usual operation all the first switches are set on and all the second switches are set off, interconnecting the cell blocks in series. On the other hand, when charging rate is adjusted, all the first switches are set off and all the second switches are set on, interconnecting in parallel the cell modules corresponding to each other in the cell blocks.

For the prevention of short circuit of the cell modules, the first and second switches are each on-off controlled so that on periods of the first and second switches do not coincide. More specifically stated, when the first switch is set on, the second switch is always set off, or when the second switch is set on, the first switch is always set off.

Stated specifically, interposed on each of the parallel lines is a current limiting element for limiting a current value flowing into the second switch to a predetermined value or less. Usable as a current limit element is, for example, a resistor or a constant current value diode. According to the specific construction, even if there is a marked difference in charging rate among cell modules corresponding to one another in the cell blocks, a current having a greater value than the predetermined value will never flow into a second switch when the second switch is set on, to prevent the second switch from burning out owing to an excessive current.

According to a second specific construction, the first connecting/disconnecting means comprises one or a plurality of serial lines for interconnecting a plurality of cell blocks and a first switch interposed on each serial line. The second connecting/disconnecting means comprises a plurality of parallel connecting points each provided on opposite terminals of each cell block and on points of connection between two of the cell modules constituting each cell block, parallel lines each extending from each of the parallel connecting points of each of the cell blocks, and second switches each interposed on each of the parallel lines extending from the other cell blocks except one cell block or from each of all the cell blocks. A pair of positive and negative input terminals of the discharge circuit are respectively connected to a positive and a negative electrodes of each of all the cell modules corresponding to one another in the all cell blocks via the parallel line. Interposed on each of the parallel lines is a current limiting element for limiting a current value flowing into the second switch to a predetermined value or less. Usable as a current limiting element is, for example, a resistor or a constant current diode.

According to the second construction, in usual operation all the first switches are set on and all the second switches are set off, interconnecting the cell blocks in series. On the other hand, when charging rate is adjusted, all the first switches are set off and all the second switches are set on, interconnecting in parallel the cell modules corresponding to each other in the cell blocks.

For the prevention of a short circuit of the cell modules, the first and second switches are each on-off controlled so that on periods of the first and second switches do not coincide. More specifically stated, when the first switch is set on, the second switch is always set off, or when the second switch is set on, the first switch is always set off.

According to the second specific construction, even if there is a marked difference in charging rate among the cell modules corresponding to one another in the cell blocks, a current having a greater value than the predetermined value will never flow into the second switch when the second switch is set on, to prevent the second switch from burning out owing to an excessive current.

Further with the second specific construction, when each of the cell modules is discharged owing to the discharge operation of the discharge circuit, two current limiting elements are merely interposed on a path through which the discharging current flows. Accordingly, the two current limiting elements merely consume the power of the cell module, so that energy loss caused by the current limiting elements is suppressed, thereby ensuring the effective use of energy.

The present invention provides a second charging rate adjusting circuit for a cell combination comprising a plurality of cell blocks each having a plurality of cell modules connected to one another in series. The circuit comprises:

first connecting/disconnecting means for connecting or disconnecting the cell blocks one another in series, second connecting/disconnecting means for connecting or disconnecting one another in parallel the cell modules corresponding to one another in the cell blocks, a plurality of charge circuits each being connected to opposite electrodes of each of the cell modules constituting at least one cell block and performing charge operation in response to a charge command, a voltage detection circuit for detecting voltage across each of the cell modules constituting at least one cell block, and a control circuit for setting the first connecting/disconnecting means into connecting state and setting the second connecting/disconnecting means into disconnecting state in usual operation when the cell combination is operated as a power supply source, while for setting the first connecting/disconnecting means into disconnecting state and setting the second connecting/disconnecting means into connecting state when the charging rate of the cell module is adjusted, and giving the charge command to one or a plurality of charge circuits based on detection result obtained by the voltage detection circuit.

The second charging rate adjusting circuit of the invention described is provided with a charge circuit instead of a discharge circuit of the first charging rate adjusting circuit. When charging rate is adjusted, the first connecting/disconnecting means is set into disconnecting state, and the second connecting/disconnecting means is set into connecting state. Accordingly, the cell modules corresponding to each other in the cell blocks are interconnected in parallel, thereby uniformizing the cell modules in charging rate.

Suppose one cell module constituting one cell block has lower voltage across the module than the other cell modules constituting the one cell block. Then the control circuit will give a charge command to a charge circuit which is connected to opposite electrodes of the one cell module, or to opposite electrodes of a cell module connected to the one cell module in parallel.

When the charge command is input to the charge circuit to perform the charge operation, charge moves from the charge circuit to the one cell module of lower voltage across the module and to one or plurality of cell modules connected to the one cell module in parallel, to charge these cell modules. As a result, these cell modules are the same as the other cell modules in charging rate. Thus all the cell modules constituting all the cell blocks are made equivalent in charging rate.

When the cell modules of the second charging rate adjusting circuit embodying the invention are adjusted in charging rates, a plurality of cell modules corresponding to each other in a plurality of cell blocks are connected in parallel to charge these cell modules with one charge circuit. Accordingly, since the second charging rate adjusting circuit is provided with the same number of the charge circuits as that of the cell modules constituting one cell block, the number of the charge circuits becomes smaller than in the case of the charging rate adjusting circuit provided with a charge circuit for every cell module constituting the cell combination.

Furthermore, with the second charging rate adjusting circuit of the invention, charging rate is adjusted by allowing a cell module of lower charging rate to be charged, so that the amount of abandoned energy is zero, thereby ensuring the effective use of energy.

Stated specifically, the second charging rate adjusting circuit is provided with a charging battery for supplying power to the plurality of charge circuits. The power obtained from the charging battery is supplied to a cell module, charging the module. Alternatively, power input terminals of the charge circuits are connected to opposite terminals of one of the cell blocks, and the power obtained from one of the cell blocks is supplied to a cell module, charging the cell module.

As described above, the charging rate adjusting circuit for a cell combination of the invention is so adapted to reduce the number of components.

BRIEF DESCRIPTION OF THE DRAWINGS

FIG. 2 is a flow chart illustrating a procedure of switching change over to be executed when an ignition switch is set on;

DETAILED DESCRIPTION OF EMBODIMENTS

The present invention as applied to a charging rate adjusting circuit for a cell combination used as a power source for hybrid cars will be described below with reference to the drawings.

First Embodiment

Figure 1:
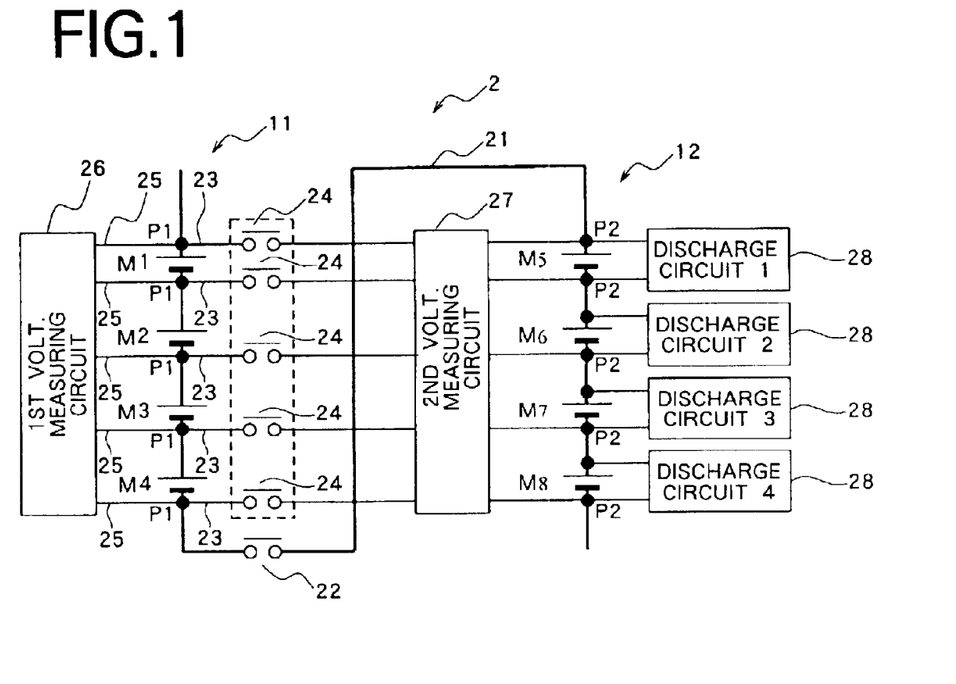
FIG. 1 is a block diagram showing a construction of a charging rate adjusting circuit of a first embodiment.

FIG. 1 shows a construction of a charging rate adjusting circuit 2 for a cell combination comprising two cell blocks 11 12. A first cell block 11 and a second cell block 12 of the circuit 2 each comprises four cell modules connected in series, and a cell module is composed of one or a plurality of secondary cells. A serial line 21 extends from a negative electrode of the first cell block 11, and an end of the serial line 21 is connected to a positive electrode of the second cell block 12. Interposed on the serial line 21 is a first switch 22. Turning on the first switch 22 interconnects the cell blocks 11, 12 in series, while turning off the first switch 22 disconnects the cellblocks 11, 12.

Five parallel connecting points P1 are provided on opposite terminals of the first cell block 11 and on points of interconnection between the cell modules M1 to M4, while eight parallel connecting points P2 are provided on opposite terminals of each of the cell modules M5 to M8 in the second cell block 12. Five parallel lines 23 extend from the five parallel connecting points P1 of the first cell block 11, respectively. Each end of the five parallel lines 23 is connected to a corresponding parallel connecting point P2 in the second cell block 12. Interposed on each of the five parallel lines 23 is a second switch 24. Turning on all the second switches 24 interconnects in parallel the two corresponding cell modules of the first and second cell blocks 11, 12, i.e., the two cell modules M1 and M5, the two cell modules M2 and M6, the two cell modules M3 and M7, and the two cell modules M4 and M8. On the other hand, turning off all the second switches 24 disconnects the two corresponding cell modules described above.

Further, five voltage detecting lines 25 extend from five parallel connecting points of the first cell block 11, respectively. The voltage detecting lines 25 are connected to a first voltage measuring circuit 26. The first voltage measuring circuit 26 measures voltage across each of four cell modules M1 to M4 constituting the first cell block 11.

Furthermore, connected to the five parallel lines 23 is a second voltage measuring circuit 27 which measures voltage across each of four cell modules M5 to M8 constituting the second cell block 12. Four discharge circuits 28 are connected to eight parallel connecting points P2 provided on opposite terminals of the cell module M5 to M8 in the second cell block 12. Usable as a discharge circuit is, for example, a discharge circuit having the same construction as a conventional discharge circuit shown in FIG. 10.

A first switch 22, five second switches 24, first and second voltage measuring circuits 26, 27, and four discharge circuits 28 are each connected to a control circuit (not shown). The control circuit changes over on/off state of the first switch and the second switch in response to on/off state of an ignition switch (not shown).

Further, with the ignition switch set on, the control circuit monitors an occurrence of an abnormality in each cell module based on voltage across each of the cell modules M1 to M8 to be measured by the first and the second voltage measuring circuit 26, 27. With the ignition switch set off, the control circuit controls discharge operation of the four discharge circuits 28 according to voltage across each of cell module M1 to M4 to be measured by the first voltage measuring circuit 26 as will be stated below.

Figure 2:
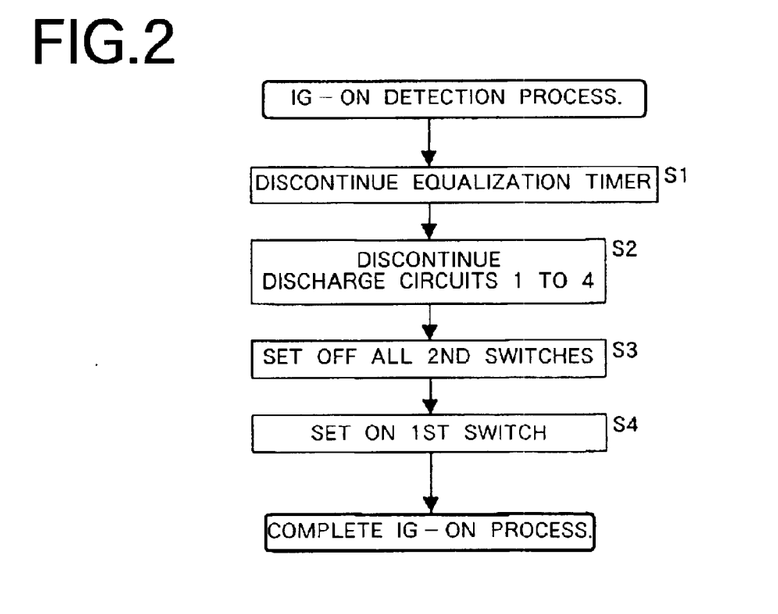

FIG. 2 shows a switch change-over procedure to be executed by the control circuit when the ignition switch is set on. The control circuit incorporates therein an interrupt timer and an equalization timer comprising a time measuring element such as a real time clock. The equalization timer outputs a pulse in a predetermined time interval, e.g., every 10 minutes.

When the ignition switch is turned on, the equalization timer is discontinued first in step S1 as illustrated, and thereafter the discharge operation of the four discharge circuits 1 to 4 is discontinued in step 52. Subsequently in step S3, all the second switches 24 are set off, and then in step S4 the first switch is set on to complete the procedure. in these steps, the first switch 22 is set on after the second switch 24 is set off. The reason is that the formation of a short circuit path for the cell modules prevents the cell modules and the circuits from burning out.

According to the procedure described, disconnected are the two corresponding cell modules of the first and second cell blocks 11, 12, i.e., the two cell modules M1 and M5, the two cell modules M2 and M6, the two cell modules M3 and M7, and the two cell modules M4 and M8. On the other hand, the first cell block 11 and the second cell block 12 are connected to each other in series, whereby the overall cell combination is operable as a power supply source.

Figure 3:
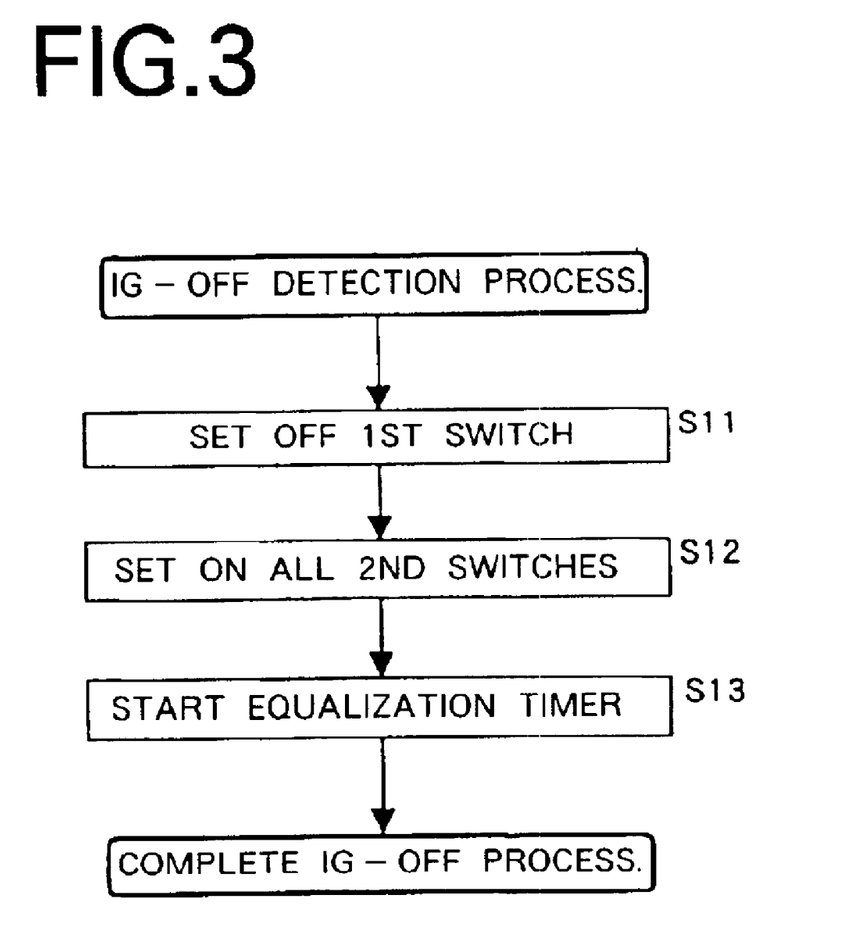
FIG. 3 a flow chart illustrating a procedure of switching change over to be executed when an ignition switch is set off.

FIG. 3 shows a switch change-over procedure to be executed by the control circuit when the ignition switch is set off. The ignition switch is found to be turned off, and then the first switch is set off in step S11 as illustrated. In step S12 all the second switches 24 are set on. In these steps the second switch 24 is set on after the first switch 22 is set off. The reason is that the formation of a short circuit path for the cell modules prevents the cell modules and the circuits from burning out. Lastly in step S13 time measuring operation of the equalization timer is started to complete the procedure.

According to the procedure described, the first cell block 11 and the second cell block 12 are disconnected as shown in FIG. 1, while interconnected in parallel are the two corresponding cell modules of the first and second cell blocks 11 12, i.e., the two cell modules M1 and M5, the two cell modules M2 and M6, the two cell modules M3 and M7, and the two cell modules M4 and M8.

In this way the two cell modules corresponding to each other of the first and the second cell blocks 11, 12 are interconnected in parallel, to start a move of charge from a cell module of high voltage across the cell module to a cell module of low voltage across the cell module, to thereby start charge and discharge between the two cell modules. The equalization timer outputs a pulse in a predetermined time interval.

Subsequently, a discharge control procedure which will be described below is executed to discharge a cell module having a high voltage value across the cell module and thereby give the cell module the same voltage value as a cell module having a low voltage value across the cell module. This provides a uniform charging rate for a plurality of cell modules constituting each cell block. In this procedure, the charging rate of the cell module reflects a voltage value across the cell module with high correlation, so that a voltage value across the cell module can be used as an index of the charging rate.

Figure 4:
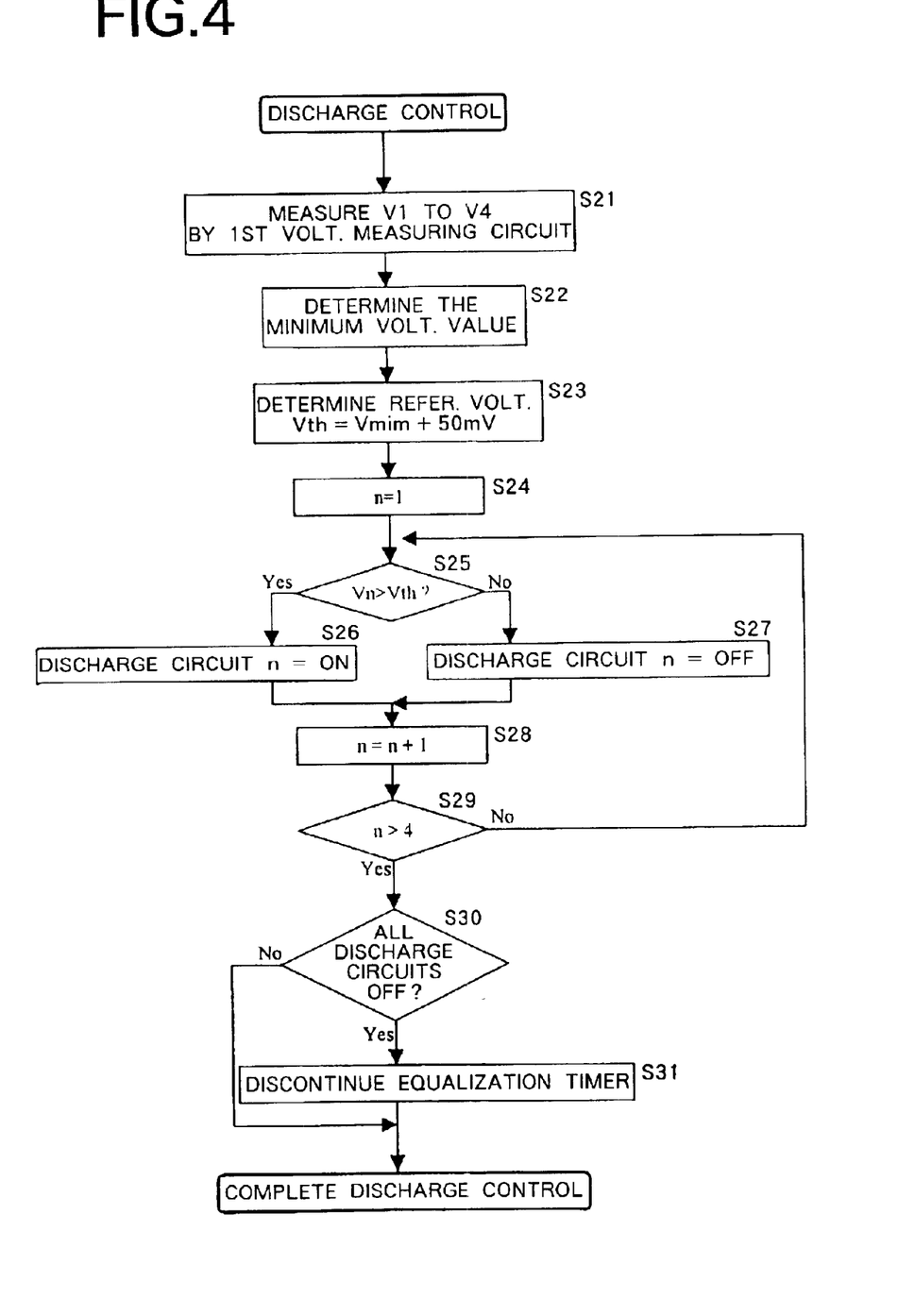
FIG. 4 is a flow chart illustrating a discharging control procedure of the first embodiment.

FIG. 4 shows the discharge control procedure to be executed by the control circuit with the ignition switch set off. The equalization timer outputs a pulse, as illustrated, obtaining values V1 to V4 of voltage across each of the four cell modules M1 to M4 from the first voltage measuring circuit 26 in step S21. In step S22, the minimum voltage value Vmin is determined among the four voltage values across the cell module. In step S23, the reference value Vth of voltage is calculated from the voltage value Vmin according to Mathematical Expression 1 given below.
Mathematical Expression 1

$$Vth=Vmin+Vo$$

wherein Vo is the constant value, which can be set to 50 mV, for example, by taking into account of a measuring error of the first voltage measuring circuit 26.

Subsequently in step S24, a counter variable n is initialized to 1, and thereafter in step S25 an inquiry is made as to whether a voltage value V1 across the cell module is greater than the reference voltage value Vth. If the answer is affirmative, a discharge operation of the discharge circuit 1 is set on in step S26, followed by step S28. On the other hand, if the answer is negative, a discharge operation of the discharge circuit 1 is set off in step S27, followed by step S28.

In step S28 a counter variable n is advanced, and thereafter an inquiry is made as to whether a counter variable n is greater than 4 in step S29. When the answer is negative, the sequence returns to step S25. Similarly, the discharge operation of the discharge circuits 2 to 4 is sequentially set on/off based on each result in comparing each of the voltage values V2 to V4 across the cell modules M2 to M4 with the reference voltage value Vth.

When the discharge operation of the discharge circuit 4 is set on/off, the answer for step S29 is affirmative, followed by step S30 to inquire whether the discharge operation of all the discharge circuits 1 to 4 is set off. In the case where any voltage value of voltage values V1 to V4 across each of the cell modules M1 to M4 is greater than the reference voltage value Vth, the discharge operation of any circuit of the discharge circuits 1 to 4 is set on, making the answer for step S30 negative to complete the above procedure. Thereafter the equalization timer outputs a pulse, to execute the above procedure again.

The procedure described above will be repeated until all the voltage values V1 to V4 across each of the cell modules M1 to M4 become smaller than the reference voltage value Vth. When all the voltage values V1 to V4 become smaller than the reference voltage value Vth, to set off the discharge operation of all the discharge circuits 1 to 4, the answer for step S30 is affirmative, followed by step S31 in which the time measuring operation of the equalization timer is discontinued to complete the procedure.

For example, in the case where a voltage value V3 across the cell module M3 is the lowest and only a voltage value V1 across the cell module Ml is greater than the value V3 by 50 mV or more, the reference voltage value Vth is calculated by adding 50 mV to the voltage value V3 across the cell module M3 in step 23 of the procedure described. Then in step S26, the discharge operation of the discharge circuit 1 is set on, followed by step S27 in which the discharge operation of the other discharge circuits 2 to 4 is set off. The discharge operation of the discharge circuit 1 is set on, allowing charge to move from the cell modules M1 and M5 to the discharge circuit 1, to discharge the two cell modules M1 and M5, thereby lowering each voltage value across each of the modules M1 and M5.

Thereafter in the process of the repetition of the procedure described, when a voltage value V1 across the cell module M1 becomes smaller than the reference value Vth, the discharge operation of the discharge circuit 1 is set off in step S27 to complete the procedure. In this way the voltage value V1 across the cell module M1 is so adjusted as to be the same as the voltage value V3 across the module M3, whereby the four cell modules M1 to M4 constituting the first cell block 11 are approximately equal in charging rate.

Furthermore, charge and discharge is conducted between the two corresponding cell modules of the first and the second cell blocks 11, 12 as stated above, with the result that the two corresponding cell modules are uniformized in charging rate. Stated specifically, the cell modules M1 and M5 are approximately equal in charging rate, and the cell modules M2 and M6, the cell modules M3 and M7, and the cell modules M4 and M8 are respectively approximately equal in charging rate. Consequently, all the cell modules M1 to M8 constituting the first and the second cell blocks 11, 12 are uinformized in charging rate.

With the charging rate adjusting circuit 2 of the embodiment, when the cell modules are adjusted for charging rate, the two corresponding cell modules of the first and the second cell blocks 11, 12 are connected to each other in parallel, whereby the two cell modules can be discharged with use of one discharge circuit. Accordingly, the charging rate adjusting circuit is provided with the same number of discharge circuits as that of the cell modules constituting one cell block, i.e., the four discharge circuits 1 to 4. The number of the discharge circuits becomes smaller than in the case of the conventional charging rate adjusting circuit which is required to be provided with eight discharge circuits 1 to 8 as shown in FIG. 9. Although the charging rate adjusting circuit of the embodiment is required to be provided with one first switch 22 and five second switches 24, the decreased amount of the number of the components due to the reduced number of discharge circuits is greater than the increased amount of the number of the components due to the first and the second switches 22, 24 which are additionally provided with since the discharge circuit 28 comprises a large number of electronic components. Consequently the number of components of the overall charging rate adjusting circuit becomes smaller than that of the conventional circuit, thereby making the circuit of the invention smaller in size. This assures the circuit operation of higher reliability and reduced cost.

With the charging rate adjusting circuit 2 of the embodiment, when the ignition switch is set off, the two corresponding cell modules of the first and the second cell blocks 11, 12 are interconnected in parallel, making equal the two voltage values across the two cell modules, so that the charging rate is adjusted based on voltage measuring result given only by the first voltage measuring circuit 26, as described above. In the adjustment of the charging rate the voltage measuring result requires high accuracy, so that usable as the first voltage measuring circuit 26 is, for example, a circuit having high accuracy of ±10 mV.

On the other hand, usable as the second voltage measuring circuit 27 is, for example, a circuit having low accuracy of ±100 mV, i.e., the minimum accuracy for monitoring the occurrence of abnormality in the cell modules M5 to M8 with the ignition switch set on. Accordingly, the cost is reduced further by the use of the circuit of low accuracy as the second voltage measuring circuit 27.

Furthermore, with the charging rate adjusting circuit 2 of the embodiment, the two cell modules interconnected in parallel and included in the first cell block 11 and the second cell block 12 are uniformized in charging rate owing to charge and discharge between the cell modules. This reduces variations in charging rate of all the cell modules M1 to M8 constituting the cell combination. The four cell modules constituting each cell block are uniformized in charging rate due to the discharge operation of the discharge circuits 28. Accordingly, the amount of energy abandoned by the discharge operation of the discharge circuits 28 becomes smaller than in the conventional charging rate adjusting circuit in which all the cell modules constituting the cell combination are uniformized in charging rate only by the discharge operation of the discharge circuit 28. This ensures the effective use of energy.

Second Embodiment

Figure 5:
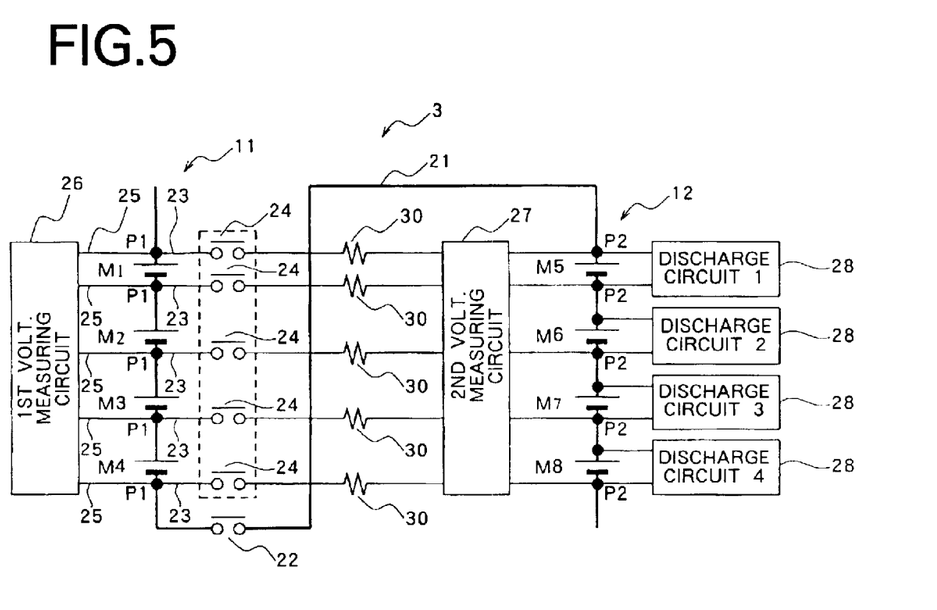
FIG. 5 is a block diagram showing a construction of a charging rate adjusting circuit of a second embodiment.

This embodiment is another charging rate adjusting circuit 3 for cell combination which is additionally provided with a resistor to the charging rate adjusting circuit of the first embodiment. As shown in FIG. 5, resistors 30 are interposed on five parallel lines 23, respectively. For example, in the case where the maximum potential difference obtained between the two corresponding cell modules of the first and the second cell blocks 11, 12 is 1.2V and the allowable current value of the second switch 24 is 2 A, the resistor value of the resistor 30 is set to 0.6Ω.

With the charging rate adjusting circuit 3 of the embodiment, even if there is marked difference in charging rate between the two corresponding cell modules of the first and the second cell blocks 11, 12, the second switch 24 will never receive a current value greater than the allowable current value when all the second switches 24 are set on, thereby preventing the second switches from burning out due to an excessive current.

With the charging rate adjusting circuit 3 of the embodiment, when the ignition switch is set on, the same switch change-over procedure as that of the first embodiment shown in FIG. 2 is executed. This interconnects the first cell block 11 and the second cell block 12 in series, whereby the cell combination overall is operable as a power supply source. Alternatively, when the ignition switch is set off, the same switch change-over procedure as that of the first embodiment shown in FIG. 3 is executed. This interconnects in parallel the two corresponding cell modules of the first cell block 11 and the second cell block 12, starting charge and discharge between the two cell modules.

Figure 6:
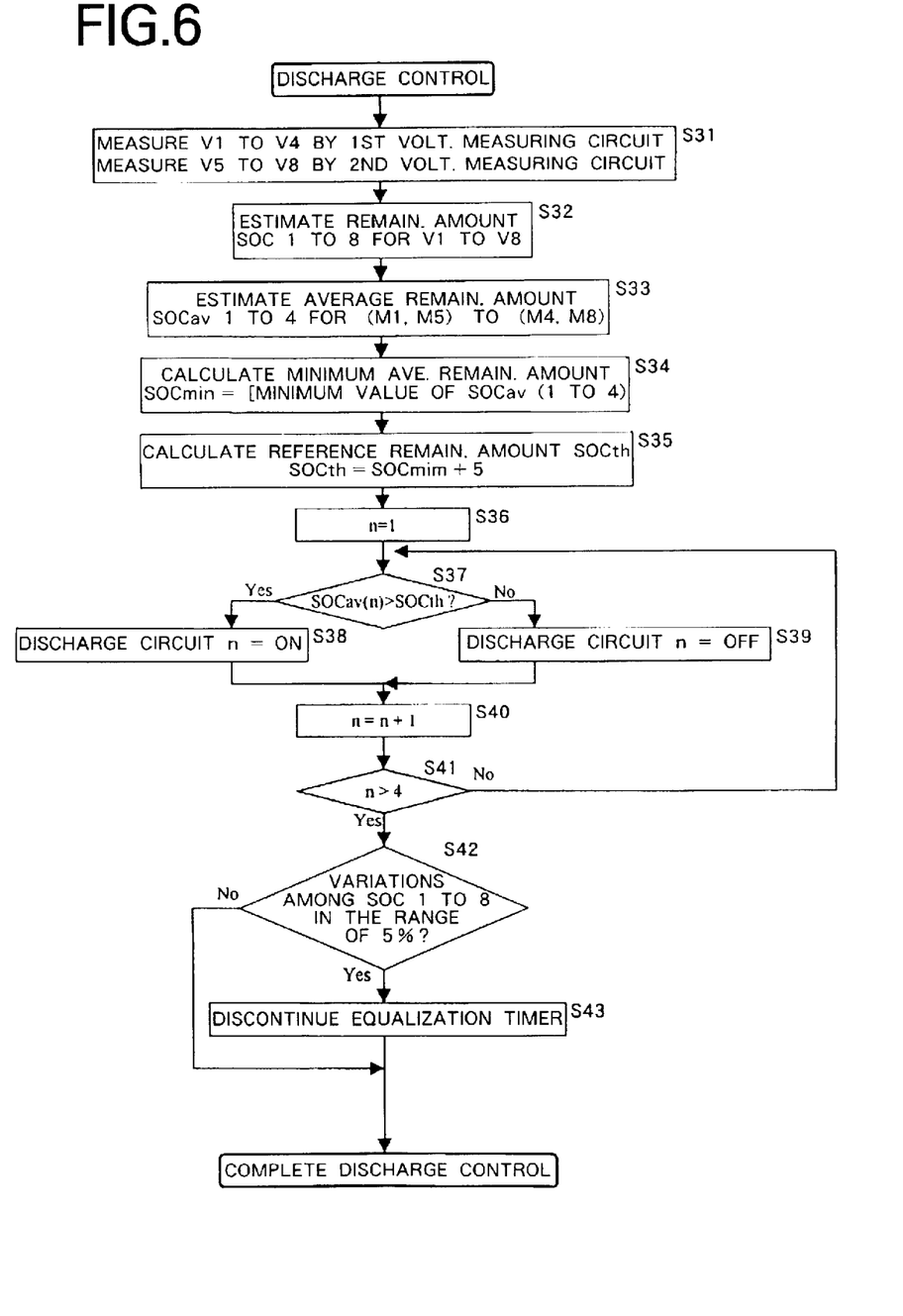
FIG. 6 is a flow chart illustrating a discharging control procedure of the second embodiment.

FIG. 6 shows the discharge control procedure to be executed by the control circuit of the embodiment with the ignition switch set off. First in step S31, the equalization timer outputs a pulse, as illustrated, obtaining voltage values V1 to V4 across each of the cell modules M1 to M4 from the first voltage measuring circuit 26 and obtaining voltage values V5 to V8 across each of the cell modules M5 to M8 from the second voltage measuring circuit 27.

Subsequently in step S32, the remaining amount value SOC in each of the cell modules is estimated based on the voltage values V1 to V8 across each of the cell modules M1 to M8. The remaining amount value SOC is percentage of the remaining amount with relative to the cell capacity fully charged. Subsequently in step S33, the average remaining value SOCav for the two corresponding cell modules of the first and the second cell blocks 11, 12 is calculated, i.e., the average remaining value SOCav1 for the cell modules M1 and M5, the average remaining value SOCav2 for the cell modules M2 and M6, the average remaining value SOCav3 for the cell modules M3 and M7, the average remaining value SOCav4 for the cell modules M4 and M8. Thereafter in step S34, the minimum average remaining amount value SOCmin is determined of the average remaining values SOCav1 to SOCav4.

In step S35, the reference remaining value SOCth is calculated from the average remaining amount value SOCmin according to Mathematical Expression 2 given below.

Mathematical Expression 2

$$SOCth = SOCmin + SOCo$$

wherein SOCth is the constant value, which is set to 5%, for example, by taking into account of a measuring error of the first voltage measuring circuit 26 and the second voltage measuring circuit 27.

Subsequently in step S36, a counter variable n is initialized to 1, followed by step S37 in which an inquiry is made as to whether the remaining amount value SOCav1 is greater than the reference remaining amount value SOCth. If the answer is affirmative, the discharge operation of the discharge circuit 1 is set on in step S38, followed by step S40. On the other hand, if the answer is negative, the discharge operation of the discharge circuit 1 is set off in step S39, followed by step S40.

In step 40 a counter variable n is advanced, followed by step S41 in which an inquiry is made as to whether the counter variable n is greater than 4. If the answer is negative, the sequence returns to step S37. Similarly, the discharge operation of the discharge circuits 2 to 4 is sequentially set on/off based on each result in comparing each of the average remaining amount values SOCav2 to SOCav4 with the reference remaining value SOCmin.

When the discharge operation of the discharge circuit 4 is set on/off, the answer for step S41 is affirmative, followed by step S42 in which an inquiry is made as to whether the variations among the remaining amount values SOC1 to SOC8 of the cell modules M1 to M8 are in the range of 5%. If the answer is negative, the procedure described is completed. Thereafter the equalization timer outputs a pulse to execute the procedure described again.

The above procedure is repeatedly executed until the variations among the remaining value SOC1 to SOC8 of the cell modules M1 to M8 are in the range of 5%. When the variations are in the rage of 5%, the answer for step S52 is affirmative, followed by step S43 in which the equalization timer discontinues its time measuring operation, to complete the above procedure.

With the charging rate adjusting circuit 3 of the embodiment, the repetition of the above procedure reduces the variations of the remaining amount of the eight cell modules M1 to M8 constituting the first and the second cell blocks 11, 12, in the range of 5%, so that the four cell modules constituting each cell block are approximately equal in charging rate, whereby charge and discharge is conducted between the two corresponding cell modules of the first and the second cell blocks 11, 12 to make the two cell modules approximately equal in charging rate. Accordingly, all the cell modules M1 to M8 constituting the first and the second cell blocks 11, 12 are uniformized in charging rate.

Third Embodiment

Figure 7:
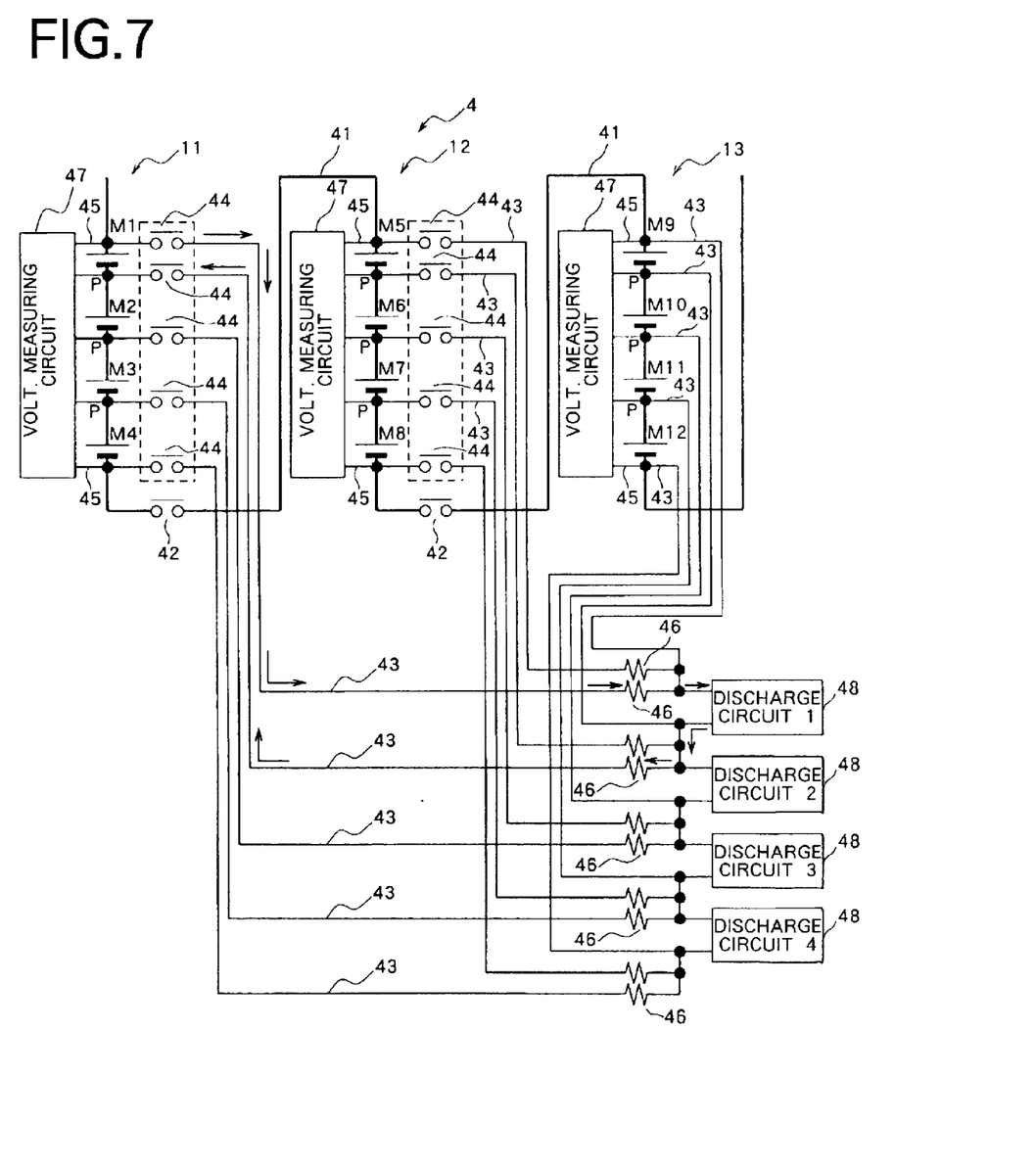
FIG. 7 is a block diagram showing a construction of a charging rate adjusting circuit of a third embodiment.

FIG. 7 shows a construction of another charging rate adjusting circuit 4 of this embodiment. The charging rate adjusting circuit 4 for a cell combination having three cell blocks 11, 12, 13 comprises a serial line 41 extending from a negative electrode of each of first cell block 11 and the second cell block 12. An end of the serial line 41 extending from the negative electrode of the first cell block 11 is connected to a positive electrode of the second cell block 12, while an end of the serial line 41 extending from the negative electrode of the second cell block 12 is connected to a positive electrode of the third cell block 12. First switches 42 are interposed on the serial line 41. Turning on the two first switches 42, 42 interconnects the first to the third cell blocks 11, 12, 13 in series, while turning off the first switches 42, 42 disconnects the first to the third cell blocks 11, 12, 13.

Five parallel connection points P are provided on points of connection between opposite terminals of each cell block or between the cell modules. Five parallel lines 43 extend from the five parallel connection points P of each cell block, respectively. The three parallel lines 43 extending from the three corresponding parallel connection points P, respectively, in the first to the third cell blocks 11, 12, 13 are interconnected on its each end. Four discharge circuits 48 are connected to the points on which the three parallel lines 43 are interconnected.

Second switches 12 are interposed on the parallel lines 43 extending from the parallel connection points P, respectively, in the first and the second cell blocks 11, 12. Turning on all the second switches 44 interconnects in parallel the three corresponding cell modules in the first to the third cell blocks 11, 12, 13, i.e., the cell modules M1, M5, M9, the cell modules M2, M6, M10, the cell modules M3, M7, M11, the cell modules M4, M8, M12, while turning off all the second switches 44 disconnects the three corresponding cell modules.

Further, resistors 46 are interposed on the parallel lines 43 extending from the parallel connection points P, respectively, in the first and the second cell blocks 11, 12. Five voltage detection lines 45 extend from the parallel connection points P, respectively. The voltage detection lines are connected to the voltage measuring circuits 47, respectively.

With the charging rate detection circuit 4 of the embodiment, when the ignition switch is set on, the two first switches 42, 42 are set on and all the second switches are set off. This interconnects the first to the third cell blocks 11, 12, 13 in series, whereby the cell combination overall is operable as a power supply source.

When the ignition switch is set off, the two first switches 42, 42 are set on and all the second switches are set off. This disconnects the first to the third cell blocks 11, 12, 13, and interconnects in parallel the three corresponding cell modules in the first to the third cell blocks 11, 12, 13, to start charge and discharge among these cell modules, finally approximately uniformazing these cell modules in charging rate.

Further, the discharge circuits 1 to 4 are on-off controlled in the same procedure as the first embodiment or the second embodiment. The four cell modules constituting each cell block are approximately equal in charging rate owing to the discharge operation of the discharge circuits 1 to 4. Accordingly, all the cell modules M1 to M12 constituting the first to the third cell blocks are uniformized in charging rate.

With the charging rate detection circuit 4 of the embodiment, two resistors 46, 46 are interposed on a path through which a discharging current flows when the discharge operation of the discharge circuits 48 discharges the cell modules in the first and the second cell blocks 11, 12. For example, in the case where the cell module M1 of the first cell block 11 is discharged, the discharging current flows from a positive electrode of the cell module M1, through the second switch 44, the resistor 46, the discharge circuit 1, the resistor 46, and the second switch 44 to the negative electrode of the cell module M1, as indicated by arrows in the drawing.

On the other hand, in the case where a charging rate adjusting circuit for a cell combination comprising three cell blocks is given based on the charging rate adjusting circuit of the second embodiment shown in FIG. 5, four resistors are interposed on a path through which the discharging current flows when each of the cell modules in the first cell block 11 is discharged. The charging rate adjusting circuit 4 of the third embodiment has only two resistors through which the discharging current flows, whereby the energy loss due to the resistors can be smaller than in the charging rate adjusting circuit wherein the discharging current flows through four resistors. This ensures the effective use of energy.

Figure 8:
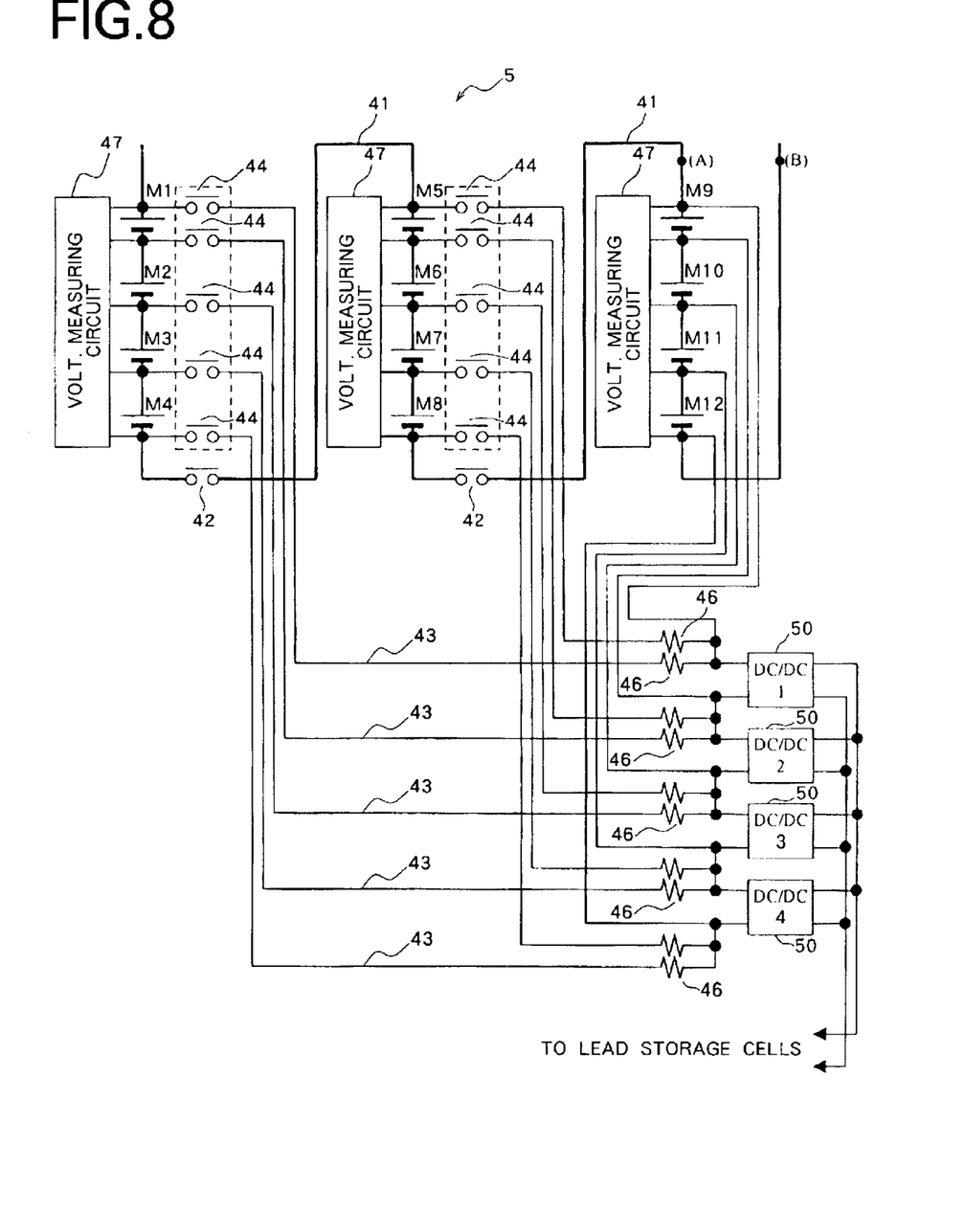
FIG. 8 is a block diagram showing a construction of a charging rate adjusting circuit of another embodiment.

According to the third embodiment, the discharge uniformizes the cell modules M1 to M12 in charging rate by the provision of the discharge circuits, whereas insulation type DC/DC converters 50 can be provided in place of the discharge circuits, as shown in FIG. 8.

Electric motor vehicles have lead storage cells mounted thereon in addition to cells in combination serving as power sources for drive motors, and power input terminals of the DC/DC converter 50, for example, are connected to such lead cells. Power given by such lead cells is supplied to a cell module of low voltage across the cell module to charge the cell module, whereby the cell modules M1 to M12 can be uniformized in charging rate. With the charging rate adjusting circuit having DC/DC converters provided described above, the abandoned amount of energy is zero, ensuring the effective use of energy.

With the charging rate adjusting circuit 5 shown in FIG. 8, the power input terminals of the DC/DC converter is adapted to be connected to opposite terminals A, B of the third cell block 13. Stated specifically, power obtained from the third cell block 13 is supplied to the cell modules constituting each cell block, to charge the cell modules.

The embodiment described above is intended to illustrate the present invention and should not be construed as limiting the invention set forth in the appended claims or reducing the scope thereof. Furthermore, the apparatus of the invention is not limited to the embodiment in construction but can of course be modified variously without departing from the scope of the invention as set forth in the claims. For example, the discharging control procedure shown in FIG. 4 is executed after the execution of the switch change-over procedure shown in FIG. 3 according to the first embodiment, whereas these procedures can be executed at the same time. Further, a resistor is used as a current limiting element shown in FIGS. 5 and 7 according to the second and the third embodiments, whereas other known current limiting element such as a constant current value diode can also be usable instead of a resistor.

What is claimed is:

1. In a cell combination comprising a plurality of cell blocks each having a plurality of cell modules connected to one another in series, a charging rate adjusting circuit adapted to produce either a uniform charging rate or a uniform voltage to the cell modules, the circuit comprising:

first connecting/disconnecting means for connecting or disconnecting the cell blocks in series, second connecting/disconnecting means for connecting or disconnecting in parallel the cell modules which correspond to one another in the cell blocks, a plurality of discharge circuits each being connected to opposite electrodes of each of the cell modules constituting at least one cell block and performing a discharge operation in response to a discharge command, a voltage detection circuit for detecting a voltage across each of the cell modules constituting at least one cell block, and a control circuit for setting the first connecting/disconnecting means into a connecting state and setting the second connecting/disconnecting means into a disconnecting state in normal operation when the cell combination is operated as a power supply source, and for setting the first connecting/disconnecting means into the disconnecting state and setting the second connecting/disconnecting means into the connecting state when the charging rate of the cell modules is adjusted, and giving the discharge command to one or a plurality of the discharge circuits based an a detection result of the voltage detection circuit.

2. A charging rate adjusting circuit according to claim 1 wherein the first connecting/disconnecting mans comprises one or a plurality of serial lines for interconnecting the plurality of cell blocks in series and a first switch interposed on each serial line, and the second connecting/disconnecting means comprises a plurality of parallel connecting points provided on opposite terminals of each of the cell blocks and on points of connection between the plurality of cell modules constituting each cell block, a plurality of parallel lines for interconnecting the parallel connecting points corresponding to each other in the cell blocks, and second switches interposed on each parallel line.

3. A charging rate adjusting circuit according to claim 2 wherein a current limiting element for limiting a current value flowing into the second switch to a predetermined value or less is interposed on each of the parallel lines.

4. A charging rate adjusting circuit according to claim 1 wherein the first connecting/disconnecting means comprises one or a plurality of serial lines for interconnecting a plurality of cell blocks and a first switch interposed on each serial line, the second connecting/disconnecting means comprises a plurality of parallel connecting points each provided on opposite terminals of each cell block and on points of connection between the cell modules constituting each cell block1 parallel lines each extending from each of the parallel connecting points of each cell block, and second switches each interposed on each of the parallel lines extending from each of die other cell blocks except one cell block or from each of all the cell blocks, a pair of positive and negative input terminals of each of the discharge circuits are respectively connected to a positive and a negative electrodes of each of all the cell modules corresponding to one another in the all cell blocks via the parallel line, and a currmt limiting element for limiting a current value flowing into the second switch to a predetermined value or less is interposed on each of the parallel lines.

5. In a cell combination comprising a plurality of cell blocks each having a plurality of cell modules connected to one another in series, a charging rate adjusting circuit adapted to produce either a uniform charging rate or a uniform voltage to the cell modules, the circuit comprising:

first connecting/disconnecting means for connecting or disconnecting the cell blocks in series, second connecting/disconnecting means for connecting or disconnecting in parallel the cell modules which comspond to one another in the cell block, a plurality of charge circuits each being connected to opposite electrodes of each of the cell modules constituting at least one cell block and performing a charge operation in response to a charge command, a voltage detection circuit for detecting a voltage across each of the cell modules constituting at least one cell block, and a control circuit for setting the first connecting/disconnecting means into a connecting state and setting the second connecting/disconnecting means into a disconnecting state in normal operation when the cell combination is operated as a power supply source, and for setting the first connecting/disconnecting means into the disconnecting state and setting the second connecting/disconnecting means into the connecting state when the charging rate of the cell modules is adjusted, and giving the charge command to one or a plurality of the charge circuits based on a detection result of the voltage detection circuit.

6. A charging rate adjusting circuit according to claim 5 which comprises a charging battery for supplying power to the plurality of charge circuits.

7. A charging rate adjusting circuit according to claim 5 wherein power input terminals of the charge circuits are connected to opposite terminals of one of the cell blocks.

* * * * *

UNITED STATES PATENT AND TRADEMARK OFFICE
CERTIFICATE OF CORRECTION

PATENT NO. : 6,828,757 B2
DATED : December 7, 2004
INVENTOR(S) : Furukuawa Kimihiko Page 1 of 1

It is certified that error appears in the above-identified patent and that said Letters Patent is hereby corrected as shown below:

<u>Column 15,</u>
Line 9, change "based an a detection" to be -- based on a detection --
Line 12, change "connecting/disconnecting mans comprises" to be -- connecting/disconnecting means comprises --
Line 35, change "block 1 parallel" to be -- block parallel --
Line 38, change "of die other" to be -- of the other --

Signed and Sealed this

Tenth Day of May, 2005

JON W. DUDAS
*Director of the United States Patent and Trademark Office*